United States Patent [19]
McGee

[11] Patent Number: 5,839,531
[45] Date of Patent: Nov. 24, 1998

[54] UNDER VEHICLE OIL CATCHER

[76] Inventor: Cecil McGee, 1804 Franklin Dr., Newton, N.C. 28658

[21] Appl. No.: 705,752

[22] Filed: Aug. 30, 1996

[51] Int. Cl.[6] .................................................. B62D 25/20
[52] U.S. Cl. ............................................ 180/69.1; 296/38
[58] Field of Search ................................ 180/69.1, 69.2, 180/69.24; 123/198 E; 184/106; 296/38

[56] References Cited

U.S. PATENT DOCUMENTS

| | | | |
|---|---|---|---|
| 2,783,848 | 3/1957 | Beskid | 180/69.1 |
| 2,841,245 | 7/1958 | Colgan | 180/69.1 |
| 2,931,453 | 4/1960 | Inglese | 180/69.1 |
| 3,316,995 | 5/1967 | Fay | 180/69.1 |
| 3,333,652 | 8/1967 | Tribuzi | 180/69.1 |
| 3,651,884 | 3/1972 | Dorries | 180/69.1 |
| 3,653,459 | 4/1972 | Andrews | 180/69.1 |
| 3,669,204 | 6/1972 | Andrews | 180/69.1 |
| 3,815,702 | 6/1974 | Paananen | 180/69.1 |
| 3,826,327 | 7/1974 | Stover | 180/69.1 |
| 3,834,527 | 9/1974 | Howe | 206/494 |
| 3,980,153 | 9/1976 | Andrews | 180/69.1 |
| 4,068,646 | 1/1978 | Hnojsky | 180/69.1 |
| 4,084,655 | 4/1978 | Savron | 180/69.1 |
| 4,655,307 | 4/1987 | Lamoureux | 180/69.1 |
| 4,695,088 | 9/1987 | Jensen | 180/69.1 |
| 4,875,537 | 10/1989 | Garnatz et al. | 180/69.1 |
| 4,909,355 | 3/1990 | Ramos | 184/106 |
| 4,936,418 | 6/1990 | Clausen | 184/106 |
| 5,181,487 | 1/1993 | Rodabaugh | 184/106 |
| 5,544,632 | 8/1996 | Choate | 184/106 |

FOREIGN PATENT DOCUMENTS 646385  11/1928  France ................................. 180/69.1

*Primary Examiner*—J. J. Swann
*Assistant Examiner*—Frank Vanaman
*Attorney, Agent, or Firm*—J. David Abernethy

[57] ABSTRACT

A disposable oil-absorbent drip pad assembly adapted for suspension under the chassis of a motor vehicle includes a first support surface and pad portion, and a second support surface and pad portion which can be separately adjusted to allow access to the oil drain plug. An air deflector deflects oil blown from the engine area due to forward motion of the vehicle against the surface of the pad.

7 Claims, 1 Drawing Sheet

UNDER VEHICLE OIL CATCHER

BACKGROUND OF THE INVENTION

This invention relates to oil drip collector pads which are secured underlying a motor vehicle to absorb oil and oil based fuels which may drip from the engine area, and will pass water through the pad.

Many motor vehicles drip oil or other oil-based fluids from the engine and transmission area. Such oil drips stain garage and carport floors on which the vehicles are parked, and also stain the surfaces of roadways on which the vehicles travel. It is commonly observed that, over time, such drips accelerate the decomposition of asphalt surfaces upon which they fall. These drips also contribute to the environmental pollution of groundwater. Wet, slick roadways also contribute to traffic deaths and injuries.

The prior art has supplied oil bibs and aprons which are secured to the undercarriage of a motor vehicle. However, the prior art devices are not in general use on either commercially used or privately owned motor vehicles. Thus, the unsightly stains, asphalt damage, and environmental pollution caused by the dripping motor vehicle fluids continue.

Fay, U.S. Pat. No. 3,316,995, discloses a motor vehicle oil drip guard including a wire netting which is folded to form an upper vehicle engaging portion adapted to directly contact the bottoms of the transmission and the crankcase, and a downwardly swingable lower portion upon which is placed a fire-proof absorbent pad. The upper portion is connected to spreader strips to which are connected the ends of tension springs having hooks on their distal ends. These hooks are attached to the motor vehicle frame. To change the pad, the lower portion is released from the spreaders and the free end thereof swings down to allow the substitution of a new pad.

Tribuzi, U.S. Pat. No. 3,333,652, discloses an oil-catching apron including flexible end flaps which fold upwardly, thereby serving to prevent excess oil from being blown from the pad as the vehicle is advanced.

These and other oil-catching devices have several deficiencies, however. First, they increase the difficulty in performing a normal oil change, as the assembly must be removed in order to gain access to the oil pan.

Second, the problem of oil being blown away from the pad as the vehicle is moving must be solved without sacrificing the ability of the vehicle to be cooled as the engine is operated. The oil drip pan is normally placed at the bottom of the engine compartment for the purpose of allowing air passing under the vehicle to cool the pan. Prior art oil drip pad assemblies generally interfere with this design, in that the pad or netting is placed in contacting relation with the oil pan; or, an upwardly extending front pad flap diverts air flow away from the oil pan. If the pad is held spaced apart from the oil pan, the passing air tends to blow the falling drops of oil to the rear and over the pad, thus falling on the road surface.

SUMMARY OF THE INVENTION

It is therefore an object of the present invention to provide an under-vehicle oil catcher assembly which is more user-friendly, in that used engine oil may be drained with minimal adjustment of the assembly.

Another object of the invention is to protect the natural environment, in that an assembly which is easy to use is more likely to be accepted and used by the motoring public to catch dripping fluids.

Yet another object of the invention is to provide an assembly which performs the function of catching blowing oil without impairing the exposure of the oil pan to the air which is moving relatively to a forwardly moving motor vehicle.

These and other objects are provided, according to the present invention, by a disposable oil-absorbent drip pad assembly adapted for suspension under the chassis of a motor vehicle. The assembly includes a support surface positionable under a motor vehicle engine and an oil-absorbent pad retained by said support surface. A first support surface and pad portion are suspended under the chassis, and a second support surface and pad portion is mounted to the first support surface portion. The second support surface and pad portion may be hingedly mounted to the first support surface, in order that the second support surface and pad portion may be separately adjusted to provide access to an oil drain plug of said motor vehicle.

An air deflector may be mounted over the first support surface so as to be positioned between the first support surface and the chassis. The air deflector directs air moving between the first support surface and the chassis against the first pad portion when the motor vehicle is moving forwards. Thus, blown oil is captured by the pad instead of being blown over the pad and onto the road surface.

BRIEF DESCRIPTION OF THE DRAWINGS

A preferred embodiment of the invention are described in the several drawings, in which.

DETAILED DESCRIPTION OF THE INVENTION

Figure 1:
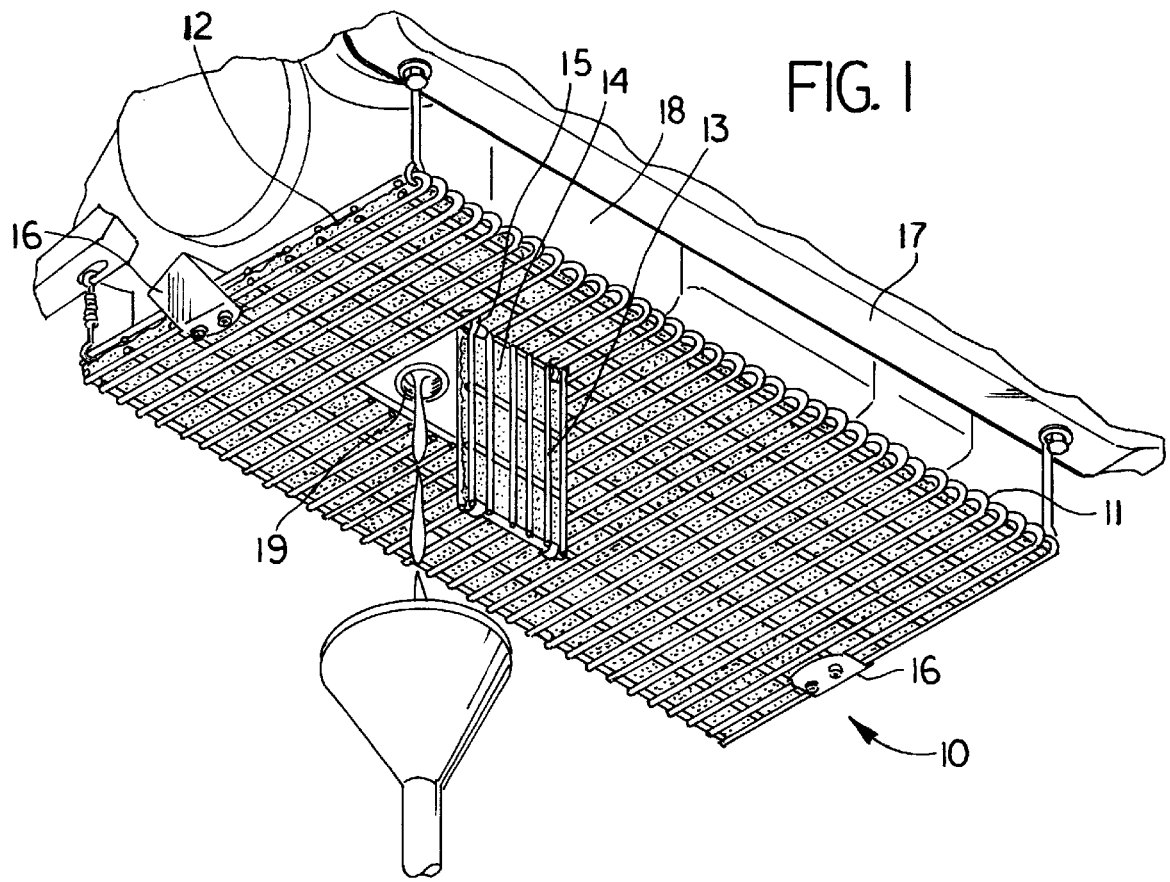
FIG. 1 is a perspective view from underneath the motor vehicle and drip pad assembly illustrating the manner in which the engine oil may be drained; and, FIG. 2 is a side elevation view illustrating the path of air moving between the drip pad assembly and the motor vehicle chassis while the motor vehicle is moving forwards.

The present invention will be described more fully hereinafter with reference to the accompanying drawings, in which one or more preferred embodiments of the invention are shown. This invention may, however, be embodied in many different forms and should not be construed as limited to the embodiment set forth herein; rather, this embodiment is provided so that the disclosure will fully convey the scope of the invention to those skilled in the art. Like numbers refer to like elements throughout. The drawings are not necessarily drawn to scale, but are configured to clearly illustrate the invention.

The inventive disposable oil-absorbent drip pad assembly 10 is attached to the underside of a motor vehicle chassis 17. Assembly 10 is attached under the engine 18.

Assembly 10 includes a first portion, including a first support surface portion 11 and a first pad portion 12, and a second portion, including a second support surface portion 13 and a second pad portion 14.

The support surface 11, 13 may be formed of cage wire having a 1 inch by two inch mesh. Cage wire, which is used for the construction of animal cages, is a sturdy wire which nonetheless may be bent into upwardly and downwardly facing surfaces in order to receive a disposable oil-absorbent pad therebetween. The bent portion of the cage wire preferably should face toward the front of the motor vehicle to provide greater air stability. Cage wire which is 30 inches wide has been found suitable for most vehicles. The length of the cage wire should be double the length of the assembly, plus about an inch in order to allow for bending. For example, the length of the cage wire may be 61 inches for a 30 inch length, 77 inches for a 38 inch length, or 97 inches for a 48 inch length. Of course, assembly 10 may be made as long or wide as necessary in order to perform its intended function of catching dripping engine oil or other motor vehicle fluids.

The first cage wire and pad portion 11, 12 may be suspended underneath chassis 17 at the front by two or four wire eye-hooks mounted to the chassis by suitable bolts. The first cage wire and pad portion 11, 12 may be suspended underneath chassis 17 at the rear by two or four eye-hook spring fasteners. Of course, any suitable mounting apparatus may be used which securely mounts the assembly to the motor vehicle without an undue amount of noise and vibration.

The first support surface and pad portion may be provided with an opening, readily formed by cutting the cage wire by wire cutters and by cutting the pad. The second support surface and pad portion 13, 14 may be mounted under the opening to the first support surface and pad portion 11, 12 on one side by detachable clips, and on the other side by a hinge 15. The assembly 10 is installed in a position that when the clips are detached as shown in FIG. 1, the second support surface and pad portion 13, 14 hangs downward and the motor vehicle oil drain plug 19 is accessable through the opening. Thus, the engine oil may be drained easily, without disturbing the position of the first support surface and pad portion 11, 12.

Figure 2:
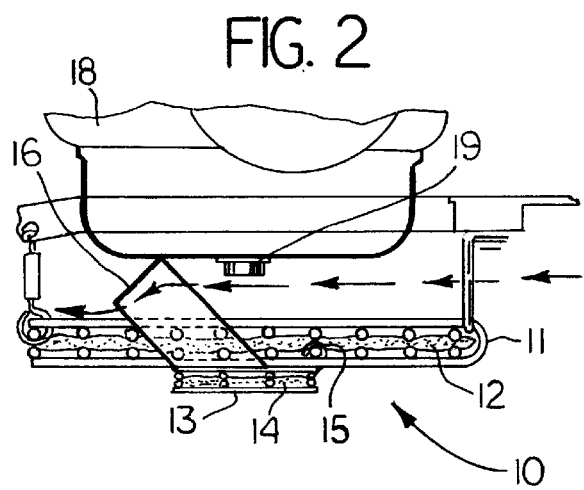

To address the problem of oil which could be blown over the pad assembly while the motor vehicle is moving forward, an air deflector 16 is mounted to the first portion 1 1 of the cage wire. Air deflector 16 may be formed from 18 gage sheet metal which is about 36 and one-half inches wide and about four inches high. Air deflector 16 is mounted to the rearward area of first portion 11 of the cage wire so as to be between the engine chassis and the cage wire when the assembly 10 is mounted. Air deflectors 6 may have a clearance from the cage wire and pad of about one inch at the rear and of about two inches at the front. As depicted in FIG. 2, air passing between the cage wire and the drip pan is directed by air deflector 16 against the surface of pad 12 when the motor vehicle is moving forward.

The air deflector 16 may have one or two $17/64$ holes drilled at each of its sides. Air deflector 16 may be mounted at each end to the cage wire by means of 4" by 1" by $1/8$" thick plates. Suitable fasteners, such as screws, pass through the holes of air deflector 16, passing through the cage wire and thence through the holes drilled in the plates, thereby mounting air deflector 16.

A suitable oil-absorbent pad is manufactured by 3M Company. These pads absorb petroleum-based fluids, but allows water to pass through the pad unabsorbed. By releasing the eye-hook spring fasteners, the pad may be removed and replaced. The small pad of the second support surface and pad portion similarly may be replaced by removing the clips.

It is to be understood that the invention is not limited to the exact details of the construction, operation, exact materials, or embodiments shown and described, as modifications and equivalents will be apparent to one skilled in the art without departing from the scope of the invention.

What is claimed is:

1. A disposable oil-absorbent drip pad assembly adapted for suspension under the chassis of a motor vehicle, comprising a support surface positionable under a motor vehicle engine, an oil-absorbent pad retained by said support surface, said assembly comprising a first support surface and pad portion, and a second support surface and pad portion whose position may be separately adjusted to provide access to an oil drain plug of said motor vehicle, and an air deflector mounted to said support surface to occupy a position between said pad and said chassis, said air deflector adapted to direct air moving between said support surface and said chassis against said pad when said motor vehicle is traveling forwards.

2. A disposable oil-absorbent drip pad assembly adapted for suspension under the chassis of a motor vehicle, said assembly comprising a support surface for support of an oil-absorbent pad, characterized in that said assembly comprises an air deflector mounted to said support surface so as to be positioned between said pad and said chassis, said air deflector adapted to direct air moving between said support surface and said chassis against said pad when said motor vehicle is moving forwards.

3. An assembly as set out in claim 2, wherein said support surface comprises a first portion and a second portion whose position may be adjusted to provide access to an oil drain plug of said motor vehicle.

4. An oil-absorbent drip pad assembly suitable for suspension under an engine of a motor vehicle while said motor vehicle is in motion, said assembly comprising:

a support surface and oil-absorbent pad positionable under said engine, and an air deflector mounted to said support surface in a position between said pad and said engine, said air deflector having a surface inclined downwards in a direction from the front of said engine to the rear of said engine, thereby being adapted to direct air moving between said support surface and said engine against said pad when said motor vehicle is moving forwards.

5. An oil-absorbent drip pad assembly as set out in claim 4, wherein said support surface and oil-absorbent pad comprise a first portion and a second portion, said second portion being separately adjustable to provide access to an oil drain plug of said motor vehicle.

6. An oil-absorbent drip pad assembly as set out in claim 4, wherein said air deflector is adapted to be located to the rearward of a forwardmost portion of said engine, thereby allowing air moving between said support surface and said engine to cool said engine prior to being directed by said air deflector.

7. An oil-absorbent drip pad assembly as set out in claim 6, wherein said support surface and oil-absorbent pad comprise a first portion and a second portion, said second portion being separately adjustable to provide access to an oil drain plug of said motor vehicle.

* * * * *